A. H. Brown,
Turning Ovals,
No 31,207. Patented Jan. 22, 1861.
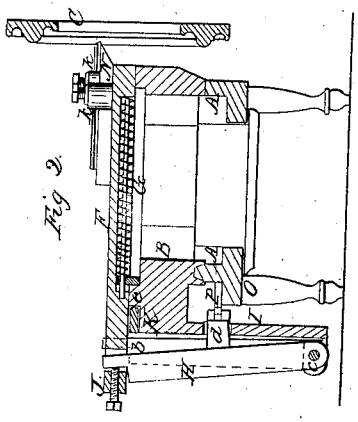
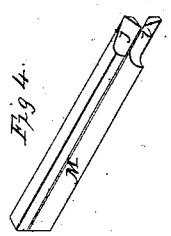
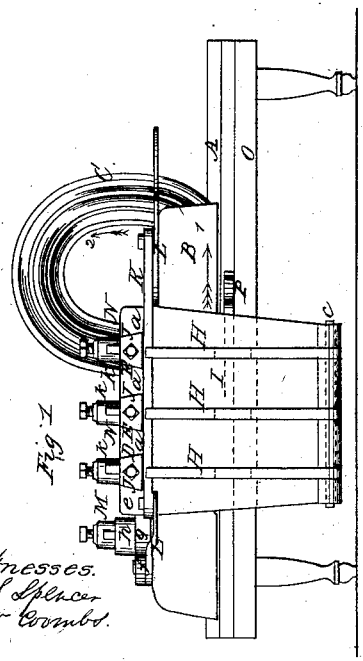
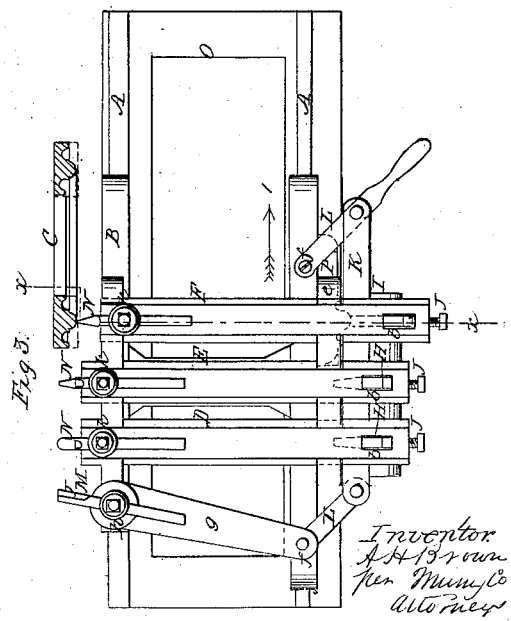
Witnesses.
A. S. Spencer
J. W. Coombs.
Inventor.
A. H. Brown
per Munn & Co
Attorneys

UNITED STATES PATENT OFFICE.

ALBERT H. BROWN, OF ALBANY, NEW YORK, ASSIGNOR TO JAMES BURTON, OF SAME PLACE.

MACHINE FOR CUTTING WOODEN MOLDINGS.

Specification of Letters Patent No. 31,207, dated January 22, 1861.

*To all whom it may concern:*

Be it known that I, ALBERT H. BROWN, of the city and county of Albany and State of New York, have invented a new and improved machine for cutting moldings on the faces of oval and circular frames and similar articles which may be turned in a concentric or eccentric lathe; and I do hereby declare that the following is a full, clear, and exact description of the same, reference being had to the annexed drawings, making a part of this specification, in which—

Figure 1 is a front elevation of my invention, Fig. 2 a transverse vertical section of the same taken in the line $x$, $x$, Fig. 3. Fig. 3 a plan or top view of the same. Fig. 4 a detached perspective view of one of the tools of the same.

Similar letters of reference indicate corresponding parts in the several figures.

This invention has for its object the ready forming of moldings on the faces of frames or similar work of oval or circular form which may be turned in a lathe.
The invention is applicable not only to the cutting or forming of moldings on frames for glasses, pictures and the like but also for cutting moldings on segments or sections of ovals and circles used for architectural purposes.

To enable those skilled in the art to fully understand and construct my invention I will proceed to describe it.

A, A, represent two parallel ways on which a carriage B is placed and allowed to slide freely back and forth thereon. These ways are placed directly in front of a lathe in which the work C, to be operated upon is placed and centered so as to be rotated. An ordinary concentric lathe is used if the work is circular but if oval work is to be operated upon an eccentric lathe would be required. As there is nothing peculiar in the construction of either lathe a particular description is not necessary.

The ways A, A, are parallel with the face of the work (as shown clearly in Fig. 3 in which the work is shown in red) and consequently the plane of rotation of the work and the path of the movement of the carriage B, are parallel.

On the upper surface of the carriage B, there are placed a series of slides D, E, F. These sides are fitted in dovetail recesses $a$, in the upper surfaces of the carriage the sides of the slides being correspondingly beveled. The slides D, E, F, are allowed to work freely in the recesses $a$, and to the underside of each slide a spiral spring G, is attached, while to their outer ends, levers H, are connected, the upper ends of said levers passing through mortises $b$, in the outer parts of the slides.

The lower ends of the levers H, are connected by a fulcrumed shaft $c$, to a pendent plate or board I, of the carriage, and each lever H, is provided at its inner side with a lateral projection $d$, which projections $d$, pass through slots in the pendent plate or board I, as shown clearly in Fig. 2.

The mortises $e$, in the outer parts of the slides D, E, F, are oblong and a set screw J, passes into the end of each slide.

On the upper end of the pendent board or plate I, there is placed a bar K, said bar being between the levers H, and an upright ledge $e$, on the carriage. The ends of this bar K, are attached to one end of parallel bars L, L, the opposite ends of said bars being pivoted to the carriage B, as shown at $f$. One of the bars L, projects beyond the bar K, and forms a handle as shown clearly in Fig. 3.

On the carriage B, there is placed a stationary bar $g$, having a tool stock $h$, at its inner end in which an adjustable tool M, is fitted. This tool may be adjusted longitudinally in its stock $h$, and its cutting edge $i$, is at its side as shown clearly in Fig. 4, $j$, being a beveled cap directly over the cutting edge $i$, to gage the cut of $i$, precisely the same as the cap of a carpenter's hand plane gages the cut of its "iron" and insures a smooth cut of the same.

The slides D, E, F, are provided at their inner ends with tool stocks $k$, in which cutters N, are fitted the latter being of gouge and V form as shown in Fig. 3.

To one side of the frame O, which supports the ways A, A, there is attached a pattern or tool guide P. This pattern is a plate the outer edge of which is a transverse profile of the molding to be cut on the work C. The pattern or tool guide is attached to the frame O, within the path of the movement of the projections $d$, of the levers H.

The operation is as follows. The work C, to be operated upon is placed in a lathe and if the work be of oval form as shown in Fig. 1, the lathe of course is an eccentric one. The work is rotated and the carriage B, is moved along on its ways A, A, in the direction indicated by arrow 1, the work C, rotating in the direction indicated by arrow 2. As the carriage B, moves in the direction indicated, the cutter N, of slide F, roughs off the face of the work C, the spring G, of slide F, keeping the tool to the work, and the pattern or guide P, so working or moving the tool in connection with the spring as to cause the tool to rough off the work in proper form. The succeeding tool N, of slide E, then passes over the work and is actuated in the same way and takes another cut or shaving off the work but with a finer cut and the tool N, of slide D, following in succession finishes or smooths the work, the tool M, planing the side or edge of the work.

The depth of the cut of the tools on slides D, E, F, may be very nicely graduated by the set screws J, and the tools of the slides are thrown from their work in order to jig back the frame B, by actuating the bar K, through the medium of lever L.

The carriage B, may be moved on its ways A, A, by any convenient power.

Having thus described my invention, I claim as new and desire to secure by Letters Patent:

The arrangement of the sliding tool holders D E F, cutters N, springs G, frame O, and pattern P, with the carriage B, levers H, bar K and bars L, as herein shown and described for the purposes set forth.

ALBERT H. BROWN.

Witnesses:
R. J. WILSON,
WM. H. BURTON.